March 7, 1967     S. M. BAGNO     3,308,306
ELECTRICAL POWER SUPPLY AND BATTERY CHARGES
Filed May 8, 1964
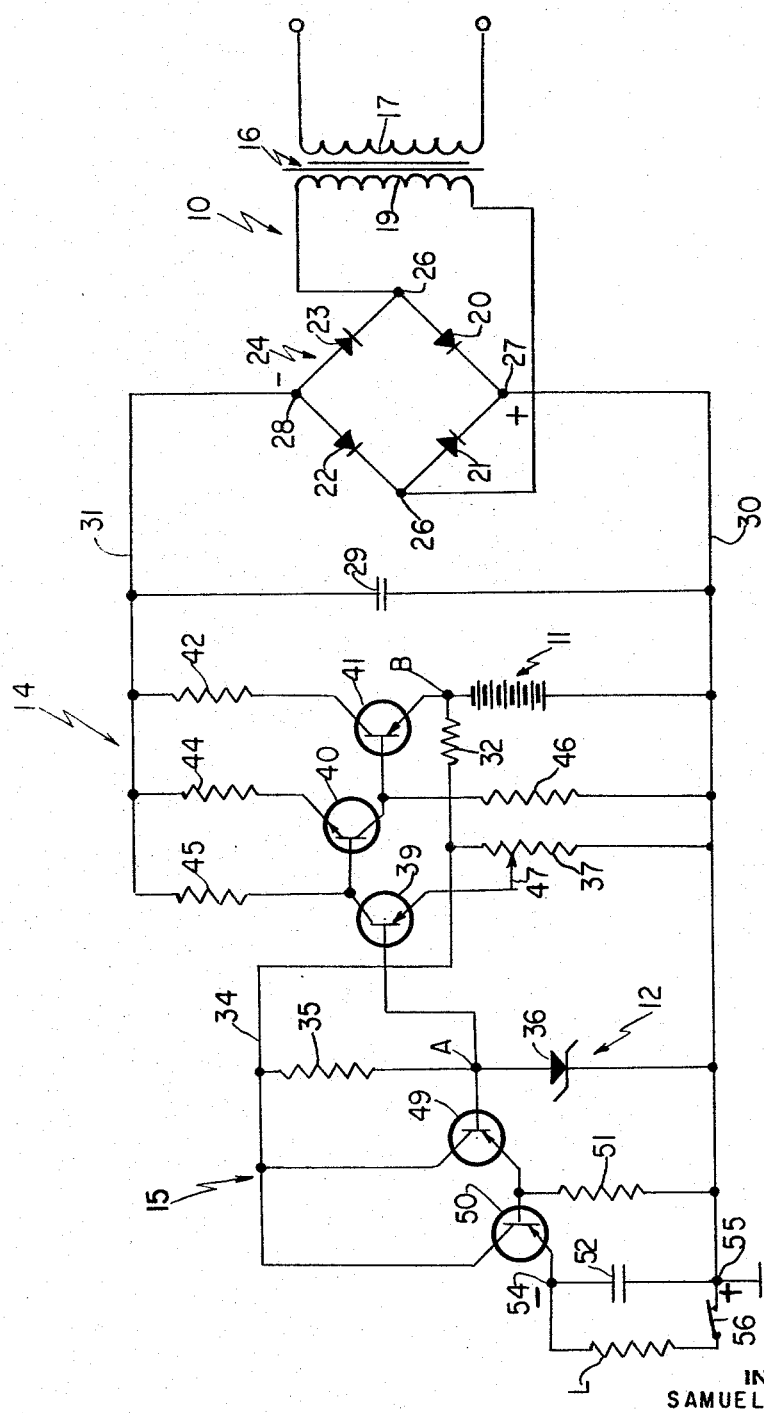
INVENTOR
SAMUEL M. BAGNO
BY
ATTORNEY

United States Patent Office 3,308,306
Patented Mar. 7, 1967

3,308,306
ELECTRICAL POWER SUPPLY AND BATTERY CHARGES
Samuel M. Bagno, Belleville, N.J., assignor to Specialties Development Corporation, Belleville, N.J., a corporation of New Jersey
Filed May 8, 1964, Ser. No. 366,089
3 Claims. (Cl. 307—66)

The present invention relates to electrical power supplies, and, more particularly, to an improved power supply having normal and standby modes of operation.

Accordingly, an object of the present invention is to provide a novel and improved electrical power supply having normal and standby modes of operation, wherein the output thereof is voltage regulated in both modes of operation.

Another object is to provide such a power supply including a rechargeable battery for standby operation and circuitry for automatically and safely recharging the battery during normal operation.

Another object is to provide such a power supply including a rechargeable battery wherein a single voltage reference device is utilized to control both voltage regulating circuitry and battery recharging circuitry.

A further object is to provide such a power supply which is simple, efficient and inexpensive to manufacture.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing an electrical power supply which comprises a source of alternating current power, means for converting the alternating current power into direct current power, means providing a variable resistance, rechargeable battery connected in series with the variable resistance means across the output of the converting means, means for producing a reference voltage, a voltage regulating circuit connected across the battery and to the reference voltage means for supplying constant voltage direct current power to a load, circuitry for comparing the battery voltage with the constant voltage and for controlling the variable resistance means in accordance with the charge in the battery to recharge the battery when necessary.

A preferred embodiment of the invention has been chosen for purposes of illustration and description, and is shown in the accompanying drawing, forming a part of the specification, wherein:

The single figure of the drawing is a circuit diagram of an electrical power supply system in accordance with the present invention.

Referring to the drawing in detail, there is shown a power supply in accordance with the present invention which generally includes a circuit 10 for converting alternating current to direct current, a rechargeable battery 11 to provide standby power, a voltage reference circuit 12, a battery charging circuit 14 under the control of the voltage reference circuit 12, and a voltage regulating circuit 15 also under the control of the voltage reference circuit 12.

The converting circuit 10 includes a stepdown transformer 16 having a primary winding 17 and a secondary winding 19, four diodes 20, 21, 22, 23 arranged in a rectifying bridge 24 having a pair of input terminals 26 and having positive and negative output terminals 27 and 28, respectively, and a filter capacitor 29. A 110 volt alternating current line is connected to the primary winding 17 of the transformer 16, and the transformer steps down this voltage to 12 volts at the secondary winding 19 which is connected across the input terminals 26 of the bridge 24. The positive output terminal 27 is connected to a conductor 30, the negative output terminal is connected to a conductor 31, and the filter capacitor 29 is connected across the conductors 30 and 31 to smooth the output of the rectifying bridge 24.

The battery 11 has a fully charged voltage of 8.75 volts, and has its positive terminal connected to the positive conductor 30 and has its negative terminal connected through a 0.5 ohm resistor 32 to a conductor 34.

The voltage reference circuit 12 comprises a 470 ohm resistor 35 and a 6 volt zener diode 36 connected in series between the conductors 30 and 34.

The battery charging circuit 14 includes a potentiometer 37, a PNP transistor 39, a NPN transistor 40, a PNP power transistor 41, a 5 ohm resistor 42, a 470 ohm resistor 44, and two 10,000 ohm resistors 45 and 46. The base of the transistor 39 is connected to the junction point of the resistor 35 and the diode 36, hereinafter referred to as point A, the emitter of the transistor 39 is connected to a sliding contact 47 on the potentiometer 37, and the collector of the transistor 39 is connected through the resistor 45 to the negative conductor 31. The base of the transistor 40 is connected to the collector of the transistor 39, the emitter of the transistor 40 is connected through the resistor 44 to the negative conductor 31, and the collector of the transistor 40 is connected through the resistor 46 to the positive conductor 30. The base of the transistor 41 is connected to the collector of the transistor 40, the emitter of the transistor 41 is connected to the junction of the battery 11 and the resistor 32, hereinafer referred to as point B, and the collector of the transistor 41 is connected through the resistor 42 to the negative conductor 31.

The voltage regulating circuit 15 includes a PNP transistor 49, a PNP transistor 50, a 470 ohm resistor 51, a 2000 micro-farad capacitor 52, and a pair of output terminals 54 and 55. The base of the transistor 49 is connected to the point A, the emitter of the transistor 49 is connected to the conductor 30 through the resistor 51, and the collector of the transistor 49 is connected to the conductor 34. The base of the transistor 50 is connected to the emitter of the transistor 49, the emitter of the transistor 50 is connected to the terminal 54, and the collector of the transistor 50 is connected to the conductor 34. The output terminal 55 is connected both to the conductor 30 and to ground, and the capacitor 52 is connected between the terminals 54 and 55. The load which the system is supplying is represented by a resistance L and is connected in series with an on-off switch 56 across the terminals 54 and 55.

In operation, under normal conditions the battery 11 is fully charged and the power delivered to the load is derived from the alternating current line connected to the primary winding 17 of the transformer 16. The circuit 10 converts the 110 volt A.C. power into 12 volt direct current power impressed across the conductors 30 and 31. The zener diode 36 holds the point A at a potential 6 volts more negative than the conductor 30, and substantially all of the voltage of the battery is dropped across the potentiometer 37 so that the slider 47 is at a potential, for example 5 volts, more negative than the conductor 30. The emitter of the transistor 39 is therefore more positive than the base thereof wherefore the transistor 39 is conducting and holds the transistors 40 and 41 in conduction. Thus, current flows from the conductor 30 through the load L, the emitter-collector circuit of the transistor 50, the conductor 34, the resistor 32, the transistor 41, and the resistor 42 to the conductor 31. The current flow in this path and the voltage across the output terminals 54 and 55 thus is controlled by the transistor 49. The voltage impressed across the base-emitter circuit of the transistor 49 is held at a constant value by the zener diode 36, therefore, the base voltage of the transistor 50 is constant and the emitter voltage thereof, which is the output voltage, is constant. The output voltage across the terminals 54, 55 is held at 5.8 volts.

When the battery 11 is fully charged, the transistor 39 is controlled so that the current flowing from point B to the conductor 31 is just sufficient to give the point B a potential of 10.5 volts more negative than the conductor 30. Thus, the potential difference between the point B and the conductor 30 is slightly greater than the voltage of the fully charged battery (8.75 volts) and a trickle charge of 5 milli-amperes flows through the battery to maintain it in the fully charged condition.

When there is an interruption in the alternating current line, the battery 11 supplies current to the load and the regulating circuit 15 operates in the manner just described so that the voltage across the terminals 54 and 55 remains constant until the battery voltage drops below the value necessary to maintain the desired output.

As the battery voltage decreases (during the period of interruption of the alternating current line), the point B becomes more positive which causes the sliding contact 47 to become more positive and increases the current in the emitter-base circuit of the transistor 39. Therefore, when service is restored on the alternating current line, the transistors 39, 40, and 41 conduct at a greater rate and the emitter-collector resistance of the transistor 41 decreases causing the point B to become more negative. The voltage between the conductor 30 and the point B is then substantially greater than the charge on the battery and the charging current flowing through the battery increases. As the charge on the battery builds up, the sliding contact 47 becomes less positive, the conduction of the transistors decreases, and the emitter-collector resistance of transistor 41 increases. The increase in the resistance of the transistor 41 causes the point B to become more positive decreasing the voltage between the conductor 30 and the point B. As the charge in the battery increases the charging rate of the battery decreases progressively, until, when the battery is fully charged, the charging current is once again reduced to a trickle.

From the foregoing description, it will be seen that the present invention provides a novel and improved electrical power supply having normal and standby modes of operation which provides a voltage regulated output in both modes of operation, includes a rechargeable battery for standby operation which is automatically and safely recharged during normal operation, includes a single voltage reference device for controlling both the voltage regulating circuitry and the battery recharging circuitry, and is simple, efficient and inexpensive to manufacture.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In an electrical power supply having a normal and a standby condition, the combination of a source of alternating current power for supplying power under the normal condition, means for converting the alternating current power into direct current power having an input connected to said source and having an output, means providing a variable resistance, a rechargeable battery having a predetermined voltage when fully charged for supplying power under the standby condition upon failure of said alternating current source, said battery being connected in series with said variable resistance means across the output of said converting means, a reference voltage device, circuit means connecting said device across said battery to produce a reference voltage output, a voltage regulating circuit connected across said battery and connected to said reference voltage device to be controlled by said reference voltage output for supplying constant voltage direct current power to a load, said constant voltage being less than said predetermined battery voltage so that said regulating circuit is effective in both normal and standby conditions, circuitry connected to said reference voltage device and to said battery for comparing the battery voltage with said constant voltage and connected to said variable resistance means for controlling said variable resistance means to vary the current flowing through said battery from said converting means inversely to changes in the charge stored in said battery.

2. In an electrical power supply having a normal and a standby condition, the combination of a source of alternating current power for supplying power under the normal condition, means for converting the alternating current power into direct current power having an input connected to said source and having an output, a transistor having an input circuit and an output circuit, a rechargeable battery having a predetermined voltage when fully charged for supplying power under the standby condition upon failure of said alternating current source, said battery being connected in series with the output circuit of said transistor across the output of said converting means, a zener diode, a resistance connected in series with said zener diode across said battery to provide a constant reference voltage at the junction of said diode and said resistance, a voltage regulating circuit connected across said battery and connected to said junction to be controlled by said reference voltage for supplying constant voltage direct current power to a load, said constant voltage being less than said predetermined battery voltage so that said regulating circuit is effective in both normal and standby conditions, a voltage dividing circuit connected across said battery, circuitry connected to said junction and to said voltage dividing circuit for comparing the battery voltage with the reference voltage and connected to the input circuit of said transistor for controlling the conductive state of said transistor to vary the current flow through said battery inversely to changes in the charge stored in said battery.

3. An electrical power supply according to claim 2 wherein said voltage regulating circuit includes a first regulating transistor having an input circuit, a resistor connected in series with said input circuit of said first regulating transistor across said zener diode, a second regulating transistor having an input and an output circuit, said input circuit of said second regulating transistor being connected in series with the load across said resistor, and said output circuit of said second regulating transistor being connected in series with the load across said battery.

References Cited by the Examiner

UNITED STATES PATENTS

| | | | |
|---|---|---|---|
| 3,060,320 | 10/1962 | Wiley | 307—64 |
| 3,123,759 | 3/1964 | Grey | 320—40 |
| 3,179,871 | 4/1965 | Bagno | 320—30 |
| 3,189,788 | 6/1965 | Cady | 307—66 X |
| 3,226,623 | 12/1965 | Krueger et al. | 320—43 |

JOHN F. COUCH, *Primary Examiner.*

S. WEINBERG, *Assistant Examiner.*